N. C. DECKER.
Horse Rake.
No. 58,073.
Patented Sept. 18, 1866.
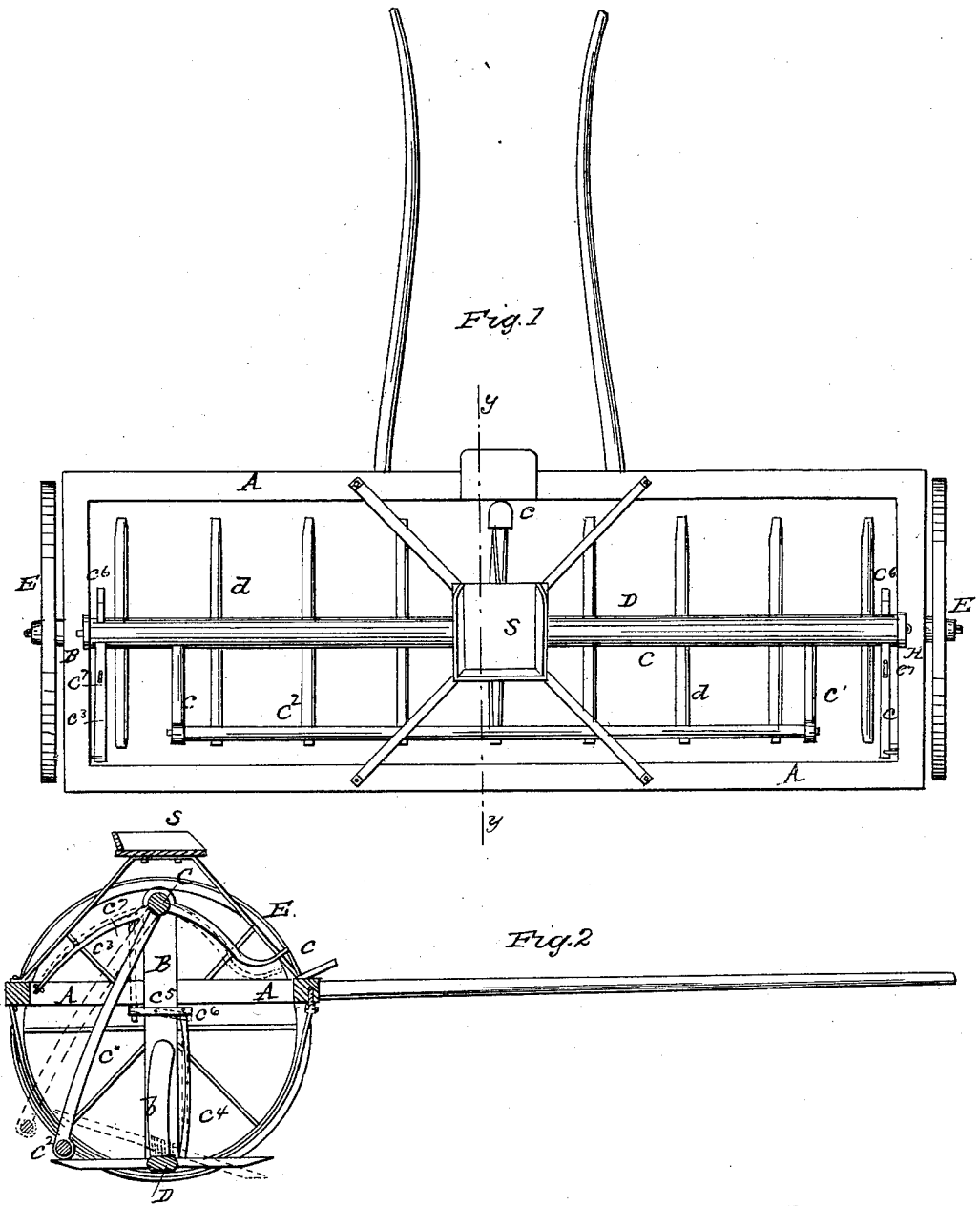

UNITED STATES PATENT OFFICE.

NICHOLAS C. DECKER, OF ST. LOUIS, MISSOURI.

IMPROVEMENT IN HORSE-RAKES.

Specification forming part of Letters Patent No. 58,073, dated September 18, 1866.

*To all whom it may concern:*

Be it known that I, NICHOLAS C. DECKER, of the city and county of St. Louis, and State of Missouri, have invented a new and useful Improvement in Sulky Hay-Rakes; and I do hereby declare that the following is a full and clear description thereof, reference being had to the accompanying drawings, and to the letters of reference marked thereon.

Figure 1 of the drawings is a plan of the improved rake. Fig. 2 is a longitudinal vertical section taken on the line $x\,y$ in Fig. 1.

To enable those skilled in the art to make and use my improved rake, I will proceed to describe its construction and operation.

A is a horizontal frame, to which the thills $a$ are attached, and which is the general supporting-frame of the machine. On each end of this frame there is a vertical post, B, as clearly shown in Fig. 2. The upper ends of these posts extend above the frame A and furnish bearings for the rock-shaft C, and the lower ends extend below the said frame nearly to the ground and furnish bearings for the rake-head D. There are short arms attached to each of the posts B, and, projecting outward therefrom, receive the wheels E, on which the machine is mounted.

The frame A is surmounted by the driver's seat S, immediately below which is a foot-lever, $c$, connected with the rock-shaft C, and used for the purpose of operating it. There are two curved levers, $c'$, attached to the rock-shaft, and projecting downward in the rear of it. The lower ends of these levers are connected together by a longitudinal bar, $c^2$, which, when the machine is in operation, will rest on the tops of the back rake-teeth, $d$, and thereby prevent the rake from turning over, except it is temporarily withdrawn from the teeth, as hereinafter described.

The two springs $c^3$ are attached to the rock-shaft permanently, while their back ends are secured to the frame A in such a manner as to allow a slight rotary motion to the said rock-shaft, and also to hold it in a certain position when left free to its own action. There are also two springs, $c^4$, pivoted to the posts B at $c^5$, and extending downward, so that their lower ends strike lugs projecting from the rake-head near its ends.

The springs $c^4$ are of peculiar construction, having a square elbow at $c^6$, as clearly shown in Fig. 2. The upper ends of them are are connected by means of links $c^7$ with the springs $c^3$, so that the two springs are operated simultaneously.

There are journals on the ends of the head D, which find their bearings in the segmental grooves $l$ in the post B.

The general construction of the rake-head D and its teeth $d$ is similar to that of most other revolving horse hay-rakes.

The operation of the rake thus constructed is as follows: The driver, being seated on his seat S, places one of his feet on the lever $c$. At the commencement of the raking operation the teeth $d$ are in nearly a horizontal position, the forward ends of them are slightly depressed, and the back ends of them resting under the bar $c^2$. The springs $c^4$ press on the tops of the lugs of the head D, (before mentioned, but not shown,) and hold the rake in this position. As the forward ends of the rake-teeth are slightly depressed, they are in a proper position to run under the hay and gather it up into a load on the top of the rake. When a sufficient quantity has been gathered and the driver desires to drop it, he will press with his foot on the lever $c$, and thereby release the bar $c^2$ from the top of the teeth by moving it backward. The same motion of the lever $c$ and rock-shaft C that releases the bar $c^2$ will act upon the spring $c^4$, which will thereby press down on the aforesaid lugs and cause the rake to upset by the forward ends of the teeth striking the ground, and thus tripping the rake, as soon as the bar $c^2$ has been drawn back, as shown by the red lines in Fig. 2, sufficiently to allow the ends of the teeth to pass above the bar. As soon as the back rake-teeth have passed above the bar $c^2$ the driver will release his pressure upon the lever $c$, when the springs $c^3$ will cause the rock-shaft C and its appendages $c'$ and $c^2$ to assume their original position.

The grooves $b$, in which the bearings of the head D rise, are made in a segmental form, as shown, because experience has proven that the operation of them in that form of groove is easier than it would be in a straight vertical groove.

Having described my invention, what I claim is—

1. The construction and arrangement of the rock-shaft C and its springs $c^3$ and $c^4$, its levers $c$ and $c'$, and the bar $c^2$, as described and set forth.

2. The arrangement of the segmental grooves $b$ in the post B, for the purpose of rendering easy the revolution of the rake.

NICHOLAS C. DECKER.

Witnesses:
CHAS. H. BOYLE,
M. RANDOLPH.